(12) United States Patent
Wu et al.

(10) Patent No.: US 7,742,291 B2
(45) Date of Patent: Jun. 22, 2010

(54) COMPUTER ENCLOSURE ADAPTED FOR MOUNTING DIFFERENT TYPES OF TRANSFER CARDS

(75) Inventors: Chia-Kang Wu, Taipei Hsien (TW); Li-Ping Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/061,650

(22) Filed: Apr. 3, 2008

(65) Prior Publication Data
US 2009/0129002 A1 May 21, 2009

(30) Foreign Application Priority Data
Nov. 20, 2007 (CN) .................... 2007 2 0201406

(51) Int. Cl.
*G06F 1/16* (2006.01)
*H05K 5/00* (2006.01)
*H05K 7/00* (2006.01)

(52) U.S. Cl. .................................. 361/679.32
(58) Field of Classification Search ............ 361/679.01, 361/679.02, 679.31, 679.32, 748, 756
See application file for complete search history.

(56) References Cited

U.S. PATENT DOCUMENTS

| | | | | |
|---|---|---|---|---|
| 5,440,755 A | * | 8/1995 | Harwer et al. ............ 710/315 |
| 5,544,006 A | * | 8/1996 | Radloff et al. ........ 361/679.32 |
| 5,594,621 A | * | 1/1997 | van Rumpt ............ 361/679.32 |
| 5,675,472 A | * | 10/1997 | Hamerton-Kelly ..... 361/679.32 |
| 5,706,173 A | * | 1/1998 | Carney et al. ............... 361/752 |
| 5,820,171 A | * | 10/1998 | Albani et al. .......... 361/679.58 |
| 5,831,821 A | * | 11/1998 | Scholder et al. ........ 361/679.32 |
| 5,835,346 A | * | 11/1998 | Albani et al. ............ 361/679.4 |
| 5,947,571 A | * | 9/1999 | Ho ........................ 361/679.58 |
| 5,963,431 A | * | 10/1999 | Stancil ....................... 361/803 |
| 6,021,049 A | * | 2/2000 | Thompson et al. ..... 361/679.27 |
| 6,105,090 A | * | 8/2000 | Fosmo ......................... 710/302 |
| 6,118,668 A | * | 9/2000 | Scholder et al. ........ 361/679.32 |
| 6,556,451 B1 | * | 4/2003 | Feightner et al. ............ 361/756 |
| 6,937,467 B2 | * | 8/2005 | Hsu ....................... 361/679.41 |
| 7,433,198 B2 | * | 10/2008 | Fan et al. ................ 361/679.01 |
| 7,499,285 B2 | * | 3/2009 | Chen et al. ................... 361/752 |
| 2005/0122703 A1 | * | 6/2005 | Fan et al. ..................... 361/801 |
| 2008/0100994 A1 | * | 5/2008 | Fan et al. ..................... 361/679 |
| 2008/0253076 A1 | * | 10/2008 | Chen .......................... 361/684 |

\* cited by examiner

*Primary Examiner*—Jayprakash N Gandhi
*Assistant Examiner*—Adrian S Wilson
(74) *Attorney, Agent, or Firm*—Frank R. Niranjan

(57) ABSTRACT

A computer enclosure includes a chassis having a rear wall, a transfer card, a mounting bracket, and a PCI card. An expansion slot is defined in the rear wall of the chassis. A detachable shielding cover is formed on the rear wall adjacent to the expansion slot. The transfer card is secured in the chassis. The transfer card has a circuit board perpendicular to the rear wall. The mounting bracket is secured to the rear wall of the chassis and has a width substantially equal to a length of the expansion slot. The PCI card is secured to the mounting bracket and perpendicularly attached to the transfer card. A receiving space corresponding to the shielding cover is defined shielding cover and the PCI card, for receiving a connector between the mounting bracket and the circuit board of the transfer card.

13 Claims, 4 Drawing Sheets

COMPUTER ENCLOSURE ADAPTED FOR MOUNTING DIFFERENT TYPES OF TRANSFER CARDS

BACKGROUND

1. Field of the Invention

The present invention relates to computer enclosures, more particularly to a computer enclosure adapted for accommodating different types of transfer cards.

2. Description of Related Art

Peripheral component interconnect cards (PCI) are widely used in computers. PCI is a kind of bus structure, which is used for connecting modem cards, monitor cards, sound cards or other peripheral equipment to a computer. A computer usually includes a plurality of PCI cards mounted on a rear wall of a computer chassis. Conventionally, one end of a PCI card is secured to a metal piece. Then, the metal piece is secured to the rear wall of the computer chassis via screws. An expansion slot is defined in the rear wall of the computer chassis corresponding to connectors of the PCI card. A transfer card perpendicular to the rear wall is secured to a bottom wall of the chassis at a position adjacent to the expansion slot. Another side of the PCI card is inserted into the transfer card and perpendicularly abuts thereon. Generally, component configurations in computers vary according to the different requirements of customers. In some case, customers may need a computer enclosure with a transfer card having another type of connector different from that of the PCI card. Thus, the conventional computer enclosure cannot satisfy the demand of customers since the PCI card abuts on the transfer card so that any other connectors installed on the transfer card would interfere with the PCI card.

What is needed, therefore, is a computer enclosure adapted for accommodating different types of transfer cards.

SUMMARY

A computer enclosure includes a chassis having a rear wall, a transfer card, a mounting bracket, and a PCI card. An expansion slot is defined in the rear wall of the chassis. A detachable shielding cover is formed on the rear wall adjacent to the expansion slot. The transfer card is secured in the chassis. The transfer card has a circuit board perpendicular to the rear wall. The mounting bracket is secured to the rear wall of the chassis and has a width substantially equal to a length of the expansion slot. The PCI card is secured to the mounting bracket and perpendicularly attached to the transfer card. A receiving space corresponding to the shielding cover is defined shielding cover and the PCI card, for receiving a connector between the mounting bracket and the circuit board of the transfer card.

Other advantages and novel features of the present invention will become more apparent from the following detailed description of preferred embodiment when taken in conjunction with the accompanying drawings, in which:

DETAILED DESCRIPTION OF THE EMBODIMENT

Figure 1:
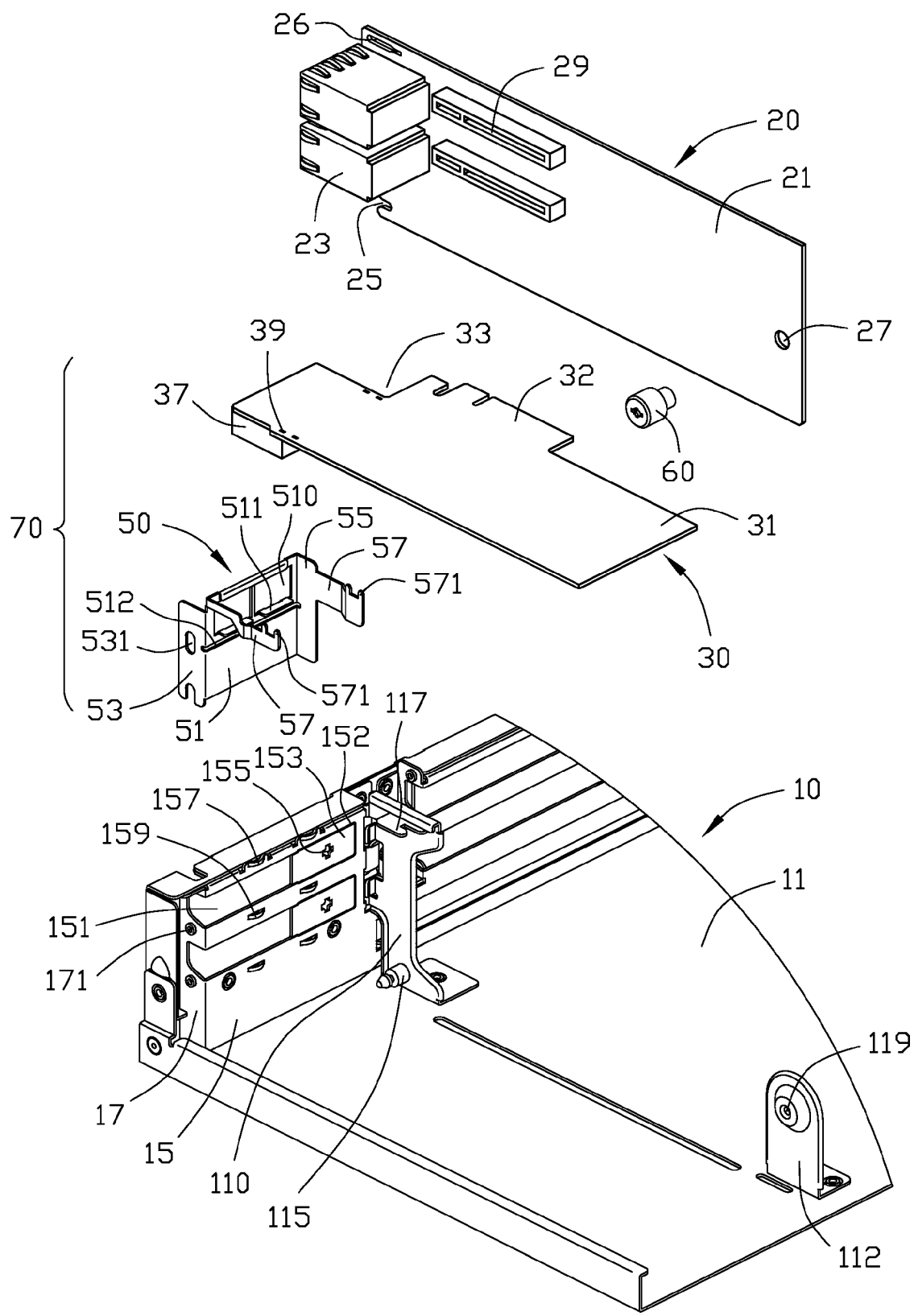
FIG. 1 is an exploded, isometric view of a computer enclosure in accordance with a preferred embodiment of the present invention, together with a transfer card.

Referring to FIG. 1, a computer enclosure for accommodating different type of transfer card includes a chassis 10 and a peripheral component interconnect (PCI) card assembly 70. The PCI card assembly 70 includes a mounting bracket 50 secured on the chassis 10 and a PCI card 30 attached to the mounting bracket 50.

The chassis 10 includes a bottom wall 11 and a rear wall 13 (shown in FIG. 3) perpendicular to the bottom wall 11. A first securing seat 110 and a second securing seat 112 are mounted on the bottom wall 11 and are aligned in a direction perpendicular to the rear wall 13. A securing post 115 protrudes from a lower end of the first securing seat 110, and an engaging hook 117 is formed at an upper end thereof. A securing hole 119 is defined in an upper portion of the second securing seat 112. A recessed portion 12 (shown in FIG. 3) is formed in the rear wall 13 adjacent to the first securing seat 110. The recessed portion 12 has a front panel 15 parallel to the rear wall 13 and a sidewall 17 perpendicular to the front panel 15. Two expansion slots 151 are defined in the front panel 15 of the recessed portion 12 in parallel. A longitudinally extending direction of each expansion slot 151 is parallel to the bottom wall 11. A detachable shielding cover 153 adjacent to the first securing seat 110 is formed at one end of each expansion slot 151. An operating hole 155 is defined in the center of each shielding cover 153. A pattern is defined in an etched portion 152 around the periphery of each shielding cover 153 for providing a friction surface for allowing a user to easily manipulate the shielding cover 153 when detaching it from the front panel 15, and a top and a bottom portion of the etched portion 152 are respectively aligned with the top edge and the bottom edge of the corresponding expansion slot 151. When the shielding cover 153 is removed, the space previously occupied by the shielding cover 153 communicates with the expansion slot 151 thus forming a longer slot than the original expansion slot 151. Two blocking members 157 protrude from an upper edge of the front panel 15 of the recessed portion 12. Two securing bridges 159 protrude from the front panel 15 between the two expansion slots 151. Two spaced positioning posts 171 protrude from the sidewall 17 of the recessed portion 12.

One type of transfer card 20 as shown in FIG. 1 includes a rectangular circuit board 21. Two securing slots 25 and 26 are respectively defined in a lower edge and an upper edge of one end portion of the circuit board 21 corresponding to the positioning posts 115 and the hook 117 of the first securing seat 110. Two connectors 23 are disposed on the circuit board 21 in a vertical line between the positioning posts 115 and the hook 117. Two parallel sockets 29 are formed on the circuit board 21 adjacent to the connectors 23. A securing hole 27 corresponding to the securing hole 119 of the second securing seat 112 is defined in the other end portion of the circuit board 21.

The PCI card 30 includes a substantially rectangular circuit board 31 with a finger portion 32 protruding from a long edge thereof. The finger portion 32 is able to be inserted in one of the sockets 29 on the transfer card 20 for providing electrical connection between the PCI card 30 and the transfer card 20. A cutout 33 fitting the connectors 23 on the transfer card 20 is defined at one corner of the circuit board 31 adjacent to the finger portion 32. Two connectors 37 are secured to the circuit board 31 under a short end thereof adjacent to the cutout 33. Two pairs of securing slots 39 are respectively defined in two sides of the circuit board 31.

The mounting bracket 50 includes a base panel 51 abutting against the front panel 15 of the chassis 10, a first sidewall 53 perpendicularly extending from the base panel 51, and a second sidewall 55 perpendicularly extending from the base panel 51 in an opposite direction relative to the first sidewall 53. The base panel 51 is substantially equal in width to the expansion slots 151. Two openings 510 corresponding to the connectors 37 are defined in an upper portion of the base panel 51. A supporting flange 511 extends in from a lower edge of each opening 510 for supporting the connectors 37. A thin securing slot 512 is defined in the base panel 51 beneath the openings 510. Two supporting arms 57 extend in toward the chassis housing respectively from a top edge of the base panel 51 and an upper portion of the second sidewall 55. A pair of spaced securing tabs 571 protrudes up from a distal end of each supporting arm 57 corresponding to one of the securing slots 39 in the PCI card 30. Two spaced positioning slots 531 are defined in the first sidewall 53 corresponding to the positioning posts 171 of the recessed portion 12.

Figure 2:
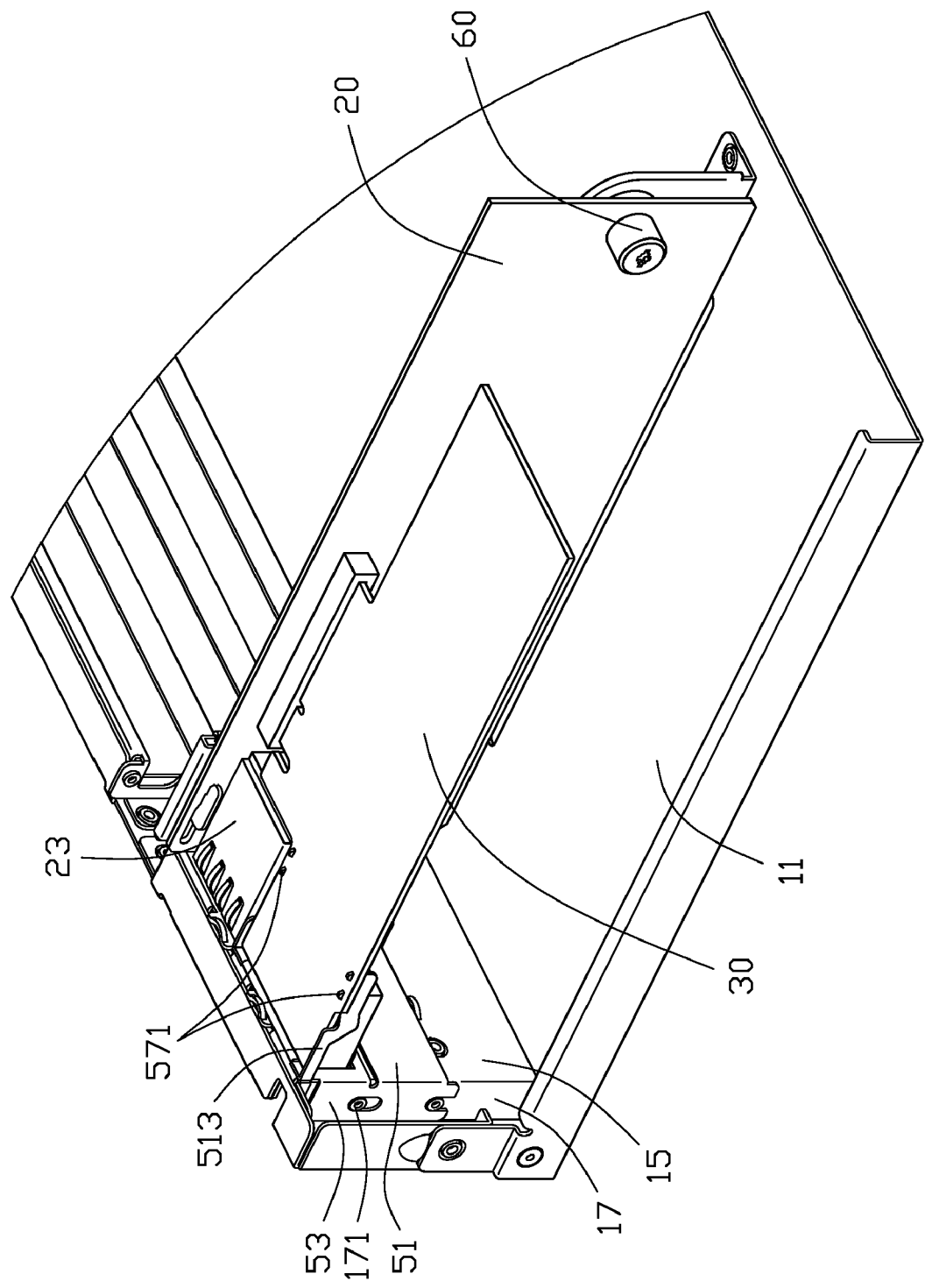
FIG. 2 is an assembled view of FIG. 1.
Figure 3:
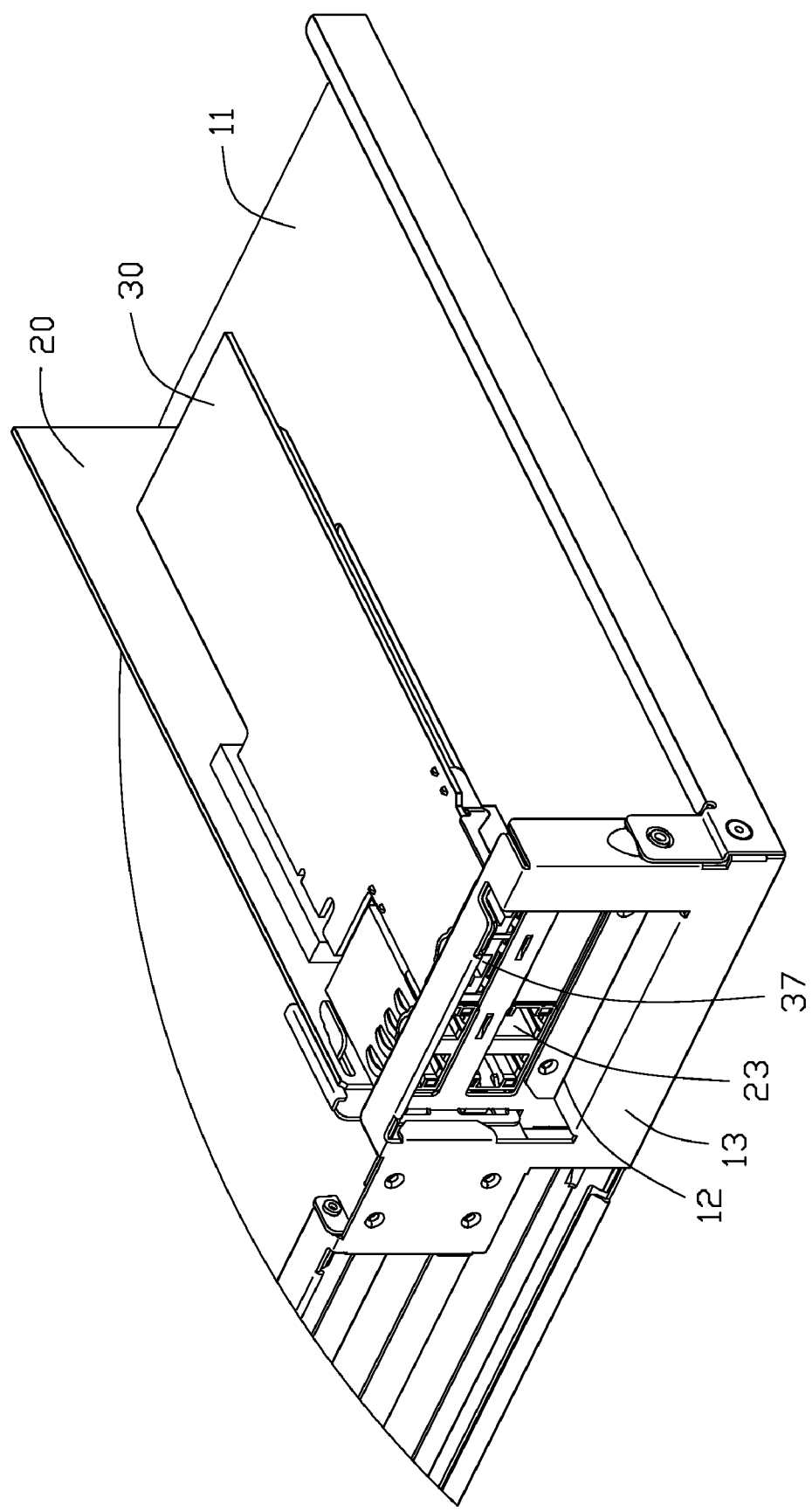
FIG. 3 is similar to FIG. 2, but viewed in another aspect, with a blocking piece on the computer enclosure being removed.

Referring to FIGS. 2 and 3, in assembly, the transfer card 20 is arranged in the chassis 10 in a manner perpendicular to the bottom wall 11 and the rear wall 13. The securing slots 25 and 26 are respectively engaged with the positioning posts 115 and the hook 117 of the first securing seat 110. The securing hole 27 in the transfer card 20 is aligned with the securing hole 119 of the second securing seat 112, and a fastening member 60 extends through the securing holes 27 and 119 to secure the transfer card 30 to the second securing seat 112. Then, the securing slots 39 of the PCI card 30 are engaged with the securing tabs 571 of the mounting bracket 50, and the bottom surface of the circuit board 31 is supported on the supporting arms 57. The connectors 37 are aligned with the corresponding opening 510 of the mounting bracket 50. The bottom edges of the connectors 37 abut on the supporting flanges 511. Thus, the PCI card 30 and the mounting bracket 50 are secured together to form a PCI card assembly 70. Then, the PCI card assembly 70 is ready to be attached to the chassis 10. The finger portion 32 of the PCI card 30 is inserted into the corresponding socket 29 of the transfer card 20. The base panel 51 of the mounting bracket 50 abuts against the front panel 15 of the chassis 10, and the two openings 510 of the mounting bracket 50 is aligned with one of the expansion slots 151 in the recessed portion 12 of the chassis 10. The securing slot 512 engages with the securing bridges 159 on the recessed portion 12 of the chassis 10, and the top edge of the mounting bracket 50 is blocked under the blocking members 157 on the recessed portion 12. The positioning slots 531 in the mounting bracket 50 are engaged with the positioning posts 171 of the recessed portion 12, and the mounting bracket 50 is secured to the recessed portion 12 of the chassis 10 in a conventional method. When the PCI card assembly 70 is completely mounted in the chassis 10, the connectors 23 of the transfer card 20 fit in the cutout 33 and occupy the vertical space defined by the cutout 33. Each connector 23 is aligned with the corresponding shielding cover 153. In actual use, the shielding covers 153 are removed from the front panel 15 via manipulation the etched portion 152 to expose the connectors 23 for access thereto. Thus, the space occupied by the shielding cover 153 combines with the expansion slot 151.

Figure 4:
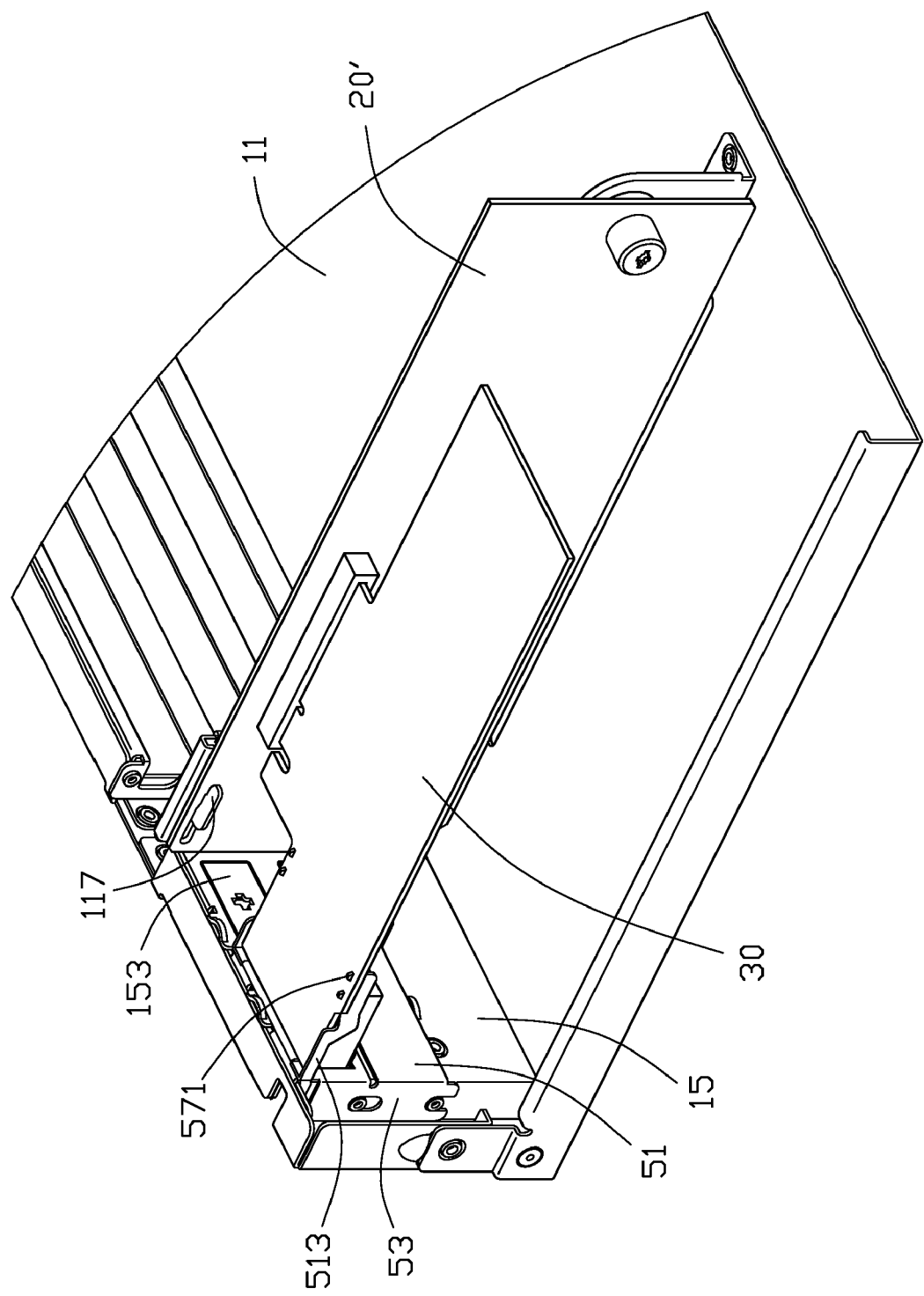
FIG. 4 is an assembled view of the computer enclosure while used for accommodating another type of transfer card.

Referring to FIG. 4, another type of transfer card 20' without connectors is mounted in the computer chassis 10 in a similar manner as the first type of transfer card 20. When the chassis 10 is used in a state as shown in FIG. 4, the shielding cover 153 is left on the base panel 51 of the recessed portion 12. An empty space corresponding to the shielding cover 153 is defined at the position defined by the cutout 33 of the PCI card 30, which is adjacent to the shielding cover 153 and the transfer card 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure, comprising:
   a chassis having a rear wall, an expansion slot defined in the rear wall, a detachable shielding cover formed on the rear wall proximate to the expansion slot, a line of weakness defined around a periphery of the shielding cover for facilitating removal of the shielding cover from the rear wall, one end portion of the rear wall is recessed inward to form a window, and the recessed portion has a front panel parallel to the rear wall and a sidewall perpendicular to the front panel;
   a transfer card secured in the chassis, the transfer card having a circuit board perpendicular to the rear wall;
   a mounting bracket having a width substantially equal to a length of the expansion slot, the mounting bracket being secured to the rear wall of the chassis, the mounting bracket comprising a base panel abutting against the front panel of the recessed portion, and a first sidewall adhered to the sidewall of the recessed portion;
   a PCI card secured to the mounting bracket and perpendicularly attached to the transfer card; and
   a receiving space defined between the shielding cover and the PCI card, for receiving a connector between the mounting bracket and the circuit board of the transfer card.

2. The computer enclosure as described in claim 1, wherein the PCI card includes a cutout defined at one corner thereof adjacent to the transfer card and the shielding cover, the cutout is configured to receive the connector.

3. The computer enclosure as described in claim 1, wherein the line of weakness has a top portion and a bottom portion respectively aligned with the top and the bottom edge of the expansion slot.

4. The computer enclosure as described in claim 1, wherein two openings are defined in an upper portion of the mounting bracket corresponding to the expansion slot, a securing slot is defined in the base panel of the mounting bracket beneath the two openings, two securing bridges protrude from the front panel of the recessed portion for engaging in the securing slot, and two blocking members protrude from an upper edge of the front panel of the recessed portion.

5. The computer enclosure as described in claim 4, wherein two connectors corresponding to the two openings of the mounting bracket is disposed at one end of the PCI card adjacent to the cutout thereof, two supporting flanges extend in from lower edges of the two openings for supporting the connectors.

6. The computer enclosure as described in claim 1, wherein two supporting arms extend in from two side of top edge of the mounting bracket, two spaced securing tabs protrude from a distal end of each supporting arm, and two pairs of securing slots are respectively defined in two side of the PCI card for the securing tabs engaging therein.

7. The computer enclosure as described in claim 1, wherein the transfer card comprises at least one connector disposed at one end thereof, the at least one connector received in the receiving space.

8. The computer enclosure as described in claim 7, wherein a socket is disposed on the transfer card adjacent to the at least one connector, a finger portion adjacent to cutout protrudes from a long edge of the PCI card for inserting in the socket on the transfer card.

9. A computer enclosure for accommodating different type of transfer card, comprising:
   a chassis having a rear wall, an expansion slot defined in the rear wall, a detachable shielding cover formed on the rear wall adjacent to the expansion slot, a line of weakness defined around a periphery of the shielding cover for facilitating removal of the shielding cover from the rear wall, one end portion of the rear wall is recessed inward to form a window, and the recessed portion has a front panel parallel to the rear wall and a sidewall perpendicular to the front panel;
   a mounting bracket having a width substantially equal to a length of the expansion slot, the mounting bracket being secured to the rear wall of the chassis, and the mounting bracket comprises a base panel abutting against the front panel of the recessed portion and a first sidewall adhered to the sidewall of the recessed portion;
   a PCI card being perpendicularly secured to the mounting bracket, a cutout defined at one corner of the PCI card adjacent to the mounting bracket, spatially corresponding to the shielding cover; and
   a receiving space defined between the mounting bracket and the PCI card at the cutout of the PCI card.

10. The computer enclosure as described in claim 9, wherein the line of weakness has a top portion and a bottom portion respectively aligned with the top and the bottom edge of the expansion slot.

11. The computer enclosure as described in claim 9, wherein two openings are defined in an upper portion of the mounting bracket corresponding to the expansion slot, a securing slot is defined in the base panel of the mounting bracket beneath the two openings, two securing bridges protrude from the front panel of the recessed portion for engaging in the securing slot, and two blocking members protrude from an upper edge of the front panel of the recessed portion.

12. The computer enclosure as described in claim 11, wherein two connectors corresponding to the two openings of the mounting bracket is disposed at one end of the PCI card adjacent to the cutout thereof, two supporting flanges extend in from lower edges of the two openings for supporting the connectors.

13. The computer enclosure as described in claim 9, wherein two supporting arms extend in from two side of top edge of the mounting bracket, two spaced securing tabs protrude from a distal end of each supporting arm, and two pairs of securing slots are respectively defined in two side of the PCI card for the securing tabs engaging therein.

* * * * *